United States Patent [19]

Ikenoya et al.

[11] 4,454,714
[45] Jun. 19, 1984

[54] EXHAUST GAS CLEANING DEVICE FOR INTERNAL COMBUSTION ENGINES

[75] Inventors: Yasuo Ikenoya, Kawagoe; Makoto Hirano, Asaka; Seishi Miura, Shiki, all of Japan

[73] Assignee: Honda Giken Kogyo Kabushiki Kaisha, Tokyo, Japan

[21] Appl. No.: 334,222

[22] Filed: Dec. 24, 1981

[30] Foreign Application Priority Data

Dec. 26, 1980 [JP] Japan ............... 55-191631[U]

[51] Int. Cl.³ .................................................. F01N 3/30
[52] U.S. Cl. ........................................ 60/293; 60/305; 180/219; 180/291
[58] Field of Search .............. 60/293, 305; 180/219, 180/291

[56] References Cited

U.S. PATENT DOCUMENTS 4,154,058 5/1979 Mase ..................................... 60/293

FOREIGN PATENT DOCUMENTS 37618 3/1977 Japan ..................................... 60/293

*Primary Examiner*—Douglas Hart
*Attorney, Agent, or Firm*—Posnack, Roberts, Cohen & Spiecens

[57] ABSTRACT

An exhaust gas cleaning device for internal combustion engines, comprising an exhaust system having an exhaust port, a secondary air supply system having an upstream secondary air supply passage communicating with the atmosphere and a downstream secondary air supply passage communicating with the exhaust port for supplying the exhaust system with secondary air, and a reed valve device disposed in the secondary air supply system and adapted to open and close in response to the pulsations of the exhaust gas pressure in the exhaust system. The reed valve device includes a valve housing constituted by a housing structure formed on the cylinder head cover of the engine and a cover member secured to the housing structure, the cover member having a plurality of projections projecting inwardly from the inner surface thereof. The reed valve device also includes a reed valve member clampingly held between the upper surface of the housing structure and the projections of the cover member. The reed valve member divides the space in the valve housing into the upstream chamber connected to the upstream secondary air supply passage and a downstream chamber connected to the downstream secondary air supply passage. The planar area of the reed valve member facing the reed valve member is greater than the area of the reed valve member.

15 Claims, 6 Drawing Figures

EXHAUST GAS CLEANING DEVICE FOR INTERNAL COMBUSTION ENGINES

BACKGROUND OF THE INVENTION

1. Field of the Invention

The present invention relates to an exhaust gas cleaning device for internal combustion engines, which is adapted to supply secondary air into an exhaust system to oxidize and remove the unburnt noxious components such as HC, CO and so forth contained in the exhaust gas flowing in the exhaust system.

2. Description of the Prior Art

An exhaust gas cleaning device has been known having a secondary air supply system connected to the exhaust system of an internal combustion engine and provided with a reed valve device adapted to be opened and closed in response to the pulsation of the exhaust gas pressure in the exhaust system, thereby to permit the secondary air to be introduced into the exhaust system to clean the exhaust gas.

This type of exhaust gas cleaning device is required to meet various demands. For instance, it is necessary for the reed valve device to be opened and closed in precise response to the pulsation of the exhaust gas to permit the required amount of secondary air to be introduced into the exhaust system without encountering any substantial resistance to ensure the oxidation of the unburnt substances. It is also required that the reed valve device be mounted in a compact manner on a suitable portion of the internal combustion engine without interfering with the layout and mounting of other equipment. The exhaust system should have a simple construction composed of a small number of parts for easy assembling and also be capable of being produced at a sufficiently low cost. It is further preferred that the exhaust gas cleaning device not adversely affect the appearance of the internal combustion engine when mounted thereon.

SUMMARY OF THE INVENTION

Accordingly, an object of the invention is to provide an exhaust gas cleaning device for internal combustion engines, which can satisfy all of the abovestated requirements.

To this end, according to the invention, there is provided an exhaust gas cleaning device for internal combustion engines comprising an exhaust system having an exhaust port, a secondary air supply system having an upstream secondary air supply passage communicating with the atmosphere and a downstream secondary air supply passage communicating with the exhaust port for supplying secondary air to the exhaust system, and a reed valve device in the secondary air supply system adapted to be opened and closed in response to the pulsations of the exhaust gas pressure in the exhaust system during engine operation. The reed valve device includes: a valve housing having a housing structure formed on a cylinder head cover and a cover member secured to the housing structure, the cover member having a plurality of projections projecting from the inner surface thereof; and a reed valve member clampingly held between an upper surface of the housing structure and the projections of the cover member. The reed valve member divides a space in the valve housing into an upstream chamber connected to the upstream secondary air passage and a downstream chamber connected to the downstream secondary air passage, the planar area of the upstream chamber facing the reed valve device being greater than the horizontal projection area of the reed valve member.

The above and other objects, features and advantages of the invention will become apparent from the following description of a preferred embodiment when taken in conjunction with the accompanying drawings.

BRIEF DESCRIPTION OF THE DRAWINGS

The accompanying drawings show a preferred embodiment of the invention in which.

DESCRIPTION OF THE PREFERRED EMBODIMENT

A preferred embodiment of the invention will be described hereinunder with reference to the accompanying drawings.

Figure 1:
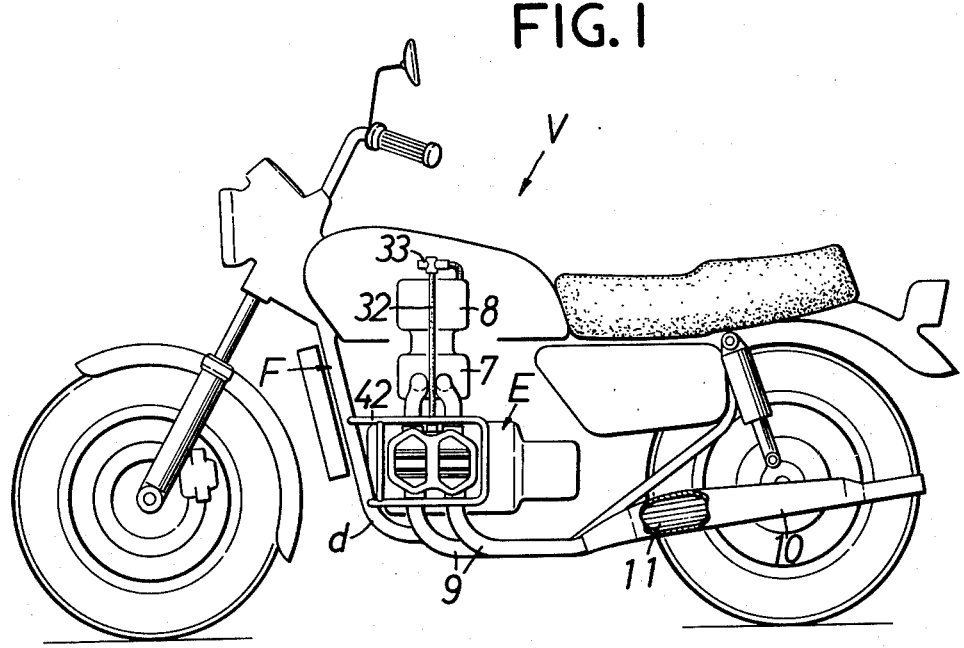
FIG. 1 is a side elevational view of a motorcycle equipped with an exhaust gas cleaning device according to the invention.
Figure 2:
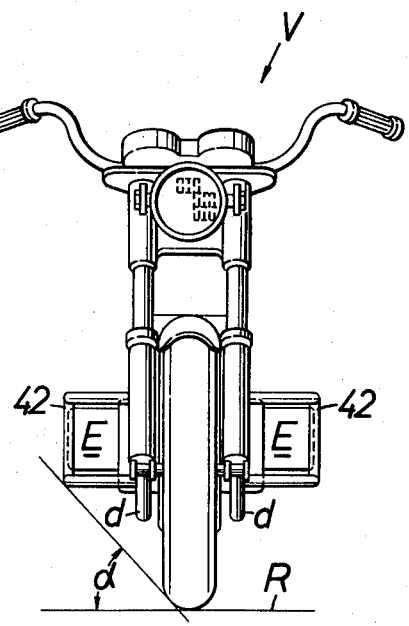
FIG. 2 is a front elevational view of the motorcycle as shown in FIG. 1.
Figure 3:
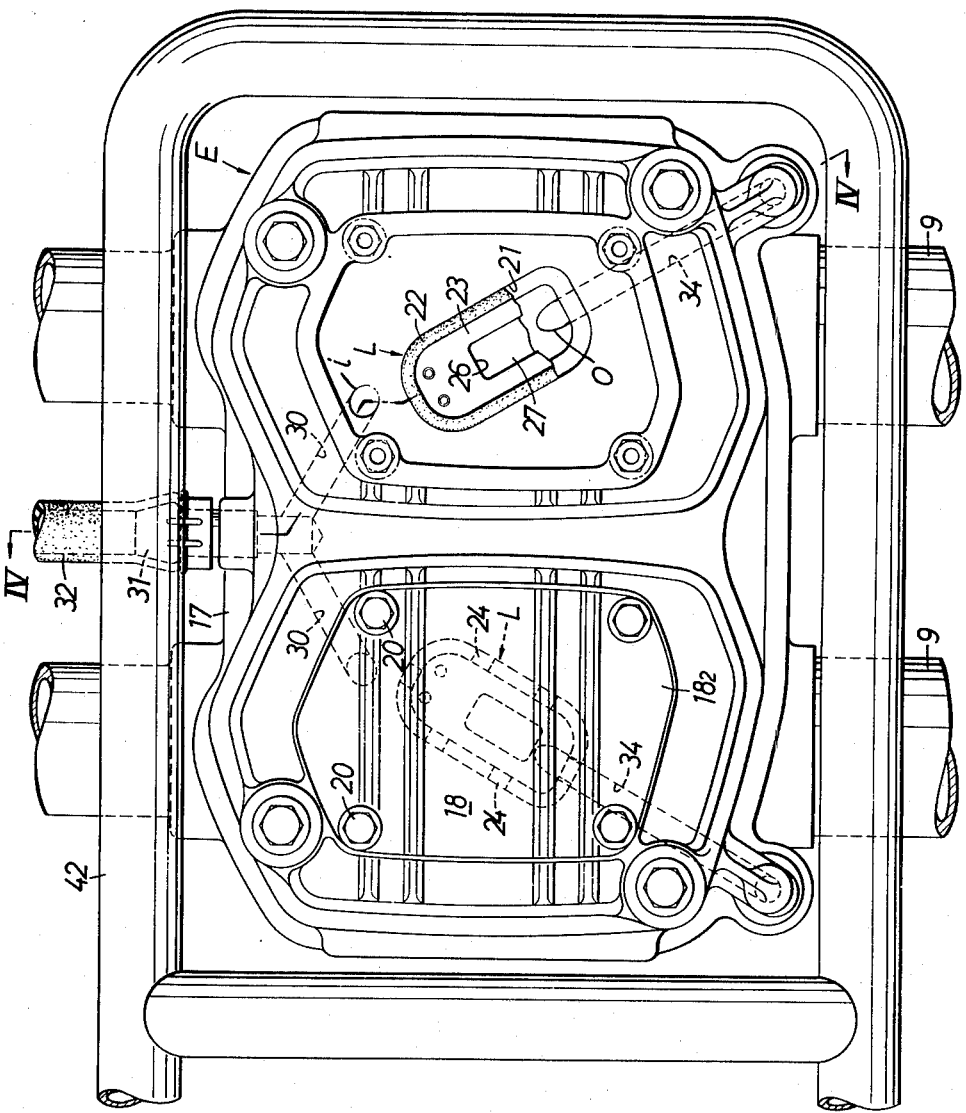
FIG. 3 is an enlarged view of a portion of the motorcycle as shown in FIG. 1.

Referring first to FIGS. 1 and 2, therein is seen a motorcycle V which has a horizontal 4-cylinder engine E mounted on the frame F thereof in such a manner that the axis of the crank shaft extends in the direction of the longitudinal axis of the motorcycle. The engine E has cylinder blocks 1 which project laterally from the frame F of the motorcycle.

Figure 4:
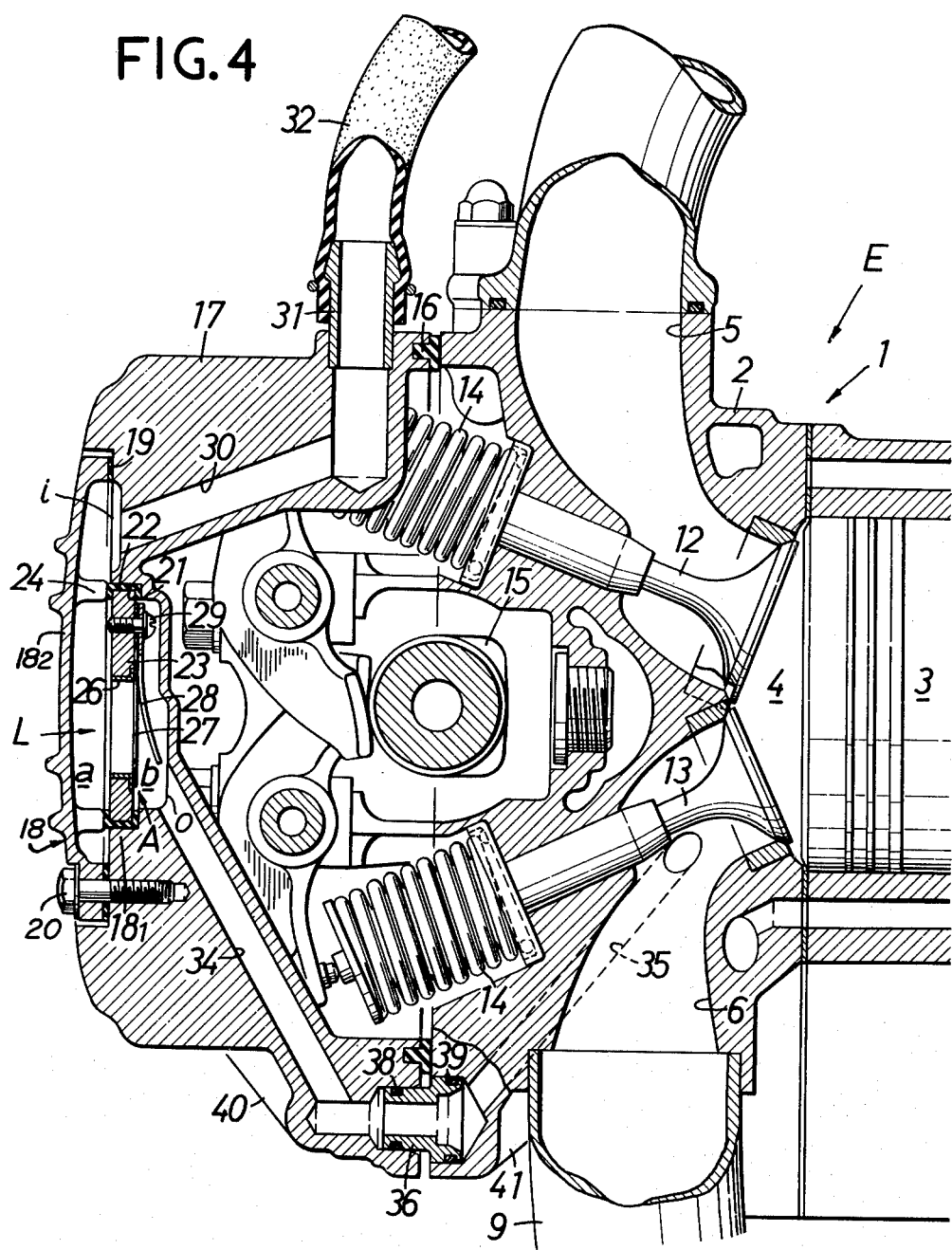
FIG. 4 is a sectional view taken along line IV—IV in FIG. 3.

As will be seen from FIG. 4, a cylinder head 2 of each cylinder block 1 is provided at its upper half part with an intake port 5 communicating with a combustion chamber 4 defined above a piston 3 and at its lower half part with an exhaust port 6 communicating with the combustion chamber 4. The intake port 5 and the exhaust port 6 open in the upper and lower sides of the cylinder head 2, respectively. An intake system disposed above the engine and including a carburetor 7, air cleaner 8 and so forth is connected to the intake port 5, while an exhaust system including an exhaust pipe 9 and a muffler 10 is connected to the exhaust port 6. A catalytic converter 11 for cleaning the exhaust gas is disposed at an intermediate portion of the muffler 10.

As is well known, the cylinder head 2 is provided with an intake valve 12 and an exhaust valve 13 which are adapted to open and close the openings of the intake port 5 and the exhaust port 6, respectively. These valves 12 and 13 are actuated by the cooperation of valve springs 14 and valve actuating mechanisms 15.

A cylinder head cover 17 is attached to the upper surface of the cylinder head 2 through the medium of a packing member 16. Reed valve devices L adapted to operate in response to the pulsations of the exhaust gas pressure and corresponding to respective cylinders are provided on the outside surface of the cylinder head cover 17.

The reed valve device L has a valve housing 18 which is constituted by a housing structure $18_1$ formed integrally on the upper side of the cylinder head cover 17 and a cover member $18_2$ mounted through a packing 19 on the housing structure 18, and fixed thereto by means of a plurality of bolts 20. The outer surface of the cover member $18_2$ is so formed to smoothly blend with the upper surface of the cylinder head cover 17 so that no convexity nor concavity is formed therebetween.

Figure 5:
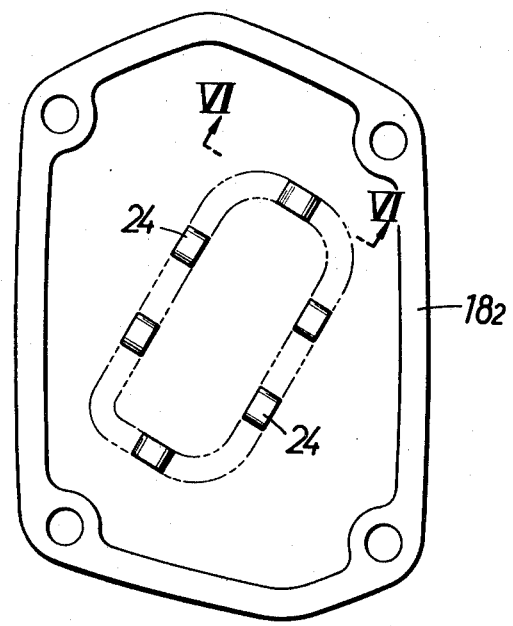
FIG. 5 is a rear elevational view of a cover member incorporated in a reed valve device.

A reed valve chamber A is formed in the valve housing 18. A recess 21 is formed in the top surface of the housing structure $18_1$ within the reed valve chamber A. A reed valve member 23 is fitted in the recess 21 through the medium of a U-shaped heat resistant packing 22. As will be seen from FIGS. 5 and 6, a plurality of projections 24 are formed on the inner surface of the cover member $18_2$, projecting inwardly therefrom. In the illustrated embodiment, there are provided six projections 24. When the cover member $18_2$ is placed of the housing structure $18_1$, the projections 24 are pressed against the corners of the upper surface of the reed valve member 23 to cooperate with the housing structure $18_1$ in clamping the reed valve member 23 therebetween.

Figure 6:
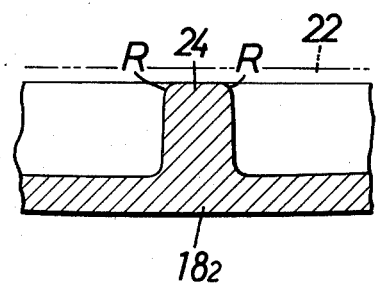
FIG. 6 is an enlarged sectional view taken along line VI—VI in FIG. 5.

The outer edge of the tip end of each projection 24 is rounded as indicated at R in FIG. 6 or shaped at an obtuse angle so as to prevent any cracking of the heat-resistant packing 22 against which the projection is pressed.

The space in the reed valve chamber A is divided into an upstream chamber a and a downstream chamber b by the reed valve member 23. The upstream chamber a and the downstream chamber b communicate with each other through a valve port 26 formed in the reed valve member 23.

As will be clearly seen from FIG. 4, the area of the upstream chamber a opposed to the plane of the reed valve member 23 is sufficiently larger than the projection area of the reed valve member 23, so that the chamber a has a sufficiently large volume even though the height of the chamber is relatively small. The reed valve member 23 is provided with a reed 27 attached to the lower surface thereof facing the downstream chamber b and a reed stopper 28 adjacent the reed 27 for limiting the opening degree of the reed 27. The reed 27 and the reed stopper 28 are secured to the reed valve member 23 by means of a stopper screw 29.

At the upper portion of the cylinder head cover 17 and at the inner side of the reed valve device, i.e. the side closer to the frame F, there is formed an upstream secondary air supply passage 30 communicating with the aforementioned upstream chamber a. The passage 30 opens in the upper surface of the cylinder head cover 17 at the inner side of the reed valve device L. The open end of the passage 30 is connecting joint 31. The secondary air introduction passage 32 is connected at an intermediate portion with an air cleaning chamber of the air cleaner 8, through an air control valve 33 shown in FIG. 1. The air control valve 33 which is known per se is adapted to be opened and closed by the operation of the internal combustion engine.

At the lower portion of the cylinder head cover 17 and at the inner side of the reed valve device L, i.e. closer to the frame F, there is formed a downstream first secondary air supply passage 34 communicating with the downstream chamber b. In consequence, the secondary air supply passage 34 opens in the surface of the cylinder head cover 17 where the head cover is connected to the cylinder head 2. Also, a downstream second secondary air supply passage 35 is formed in the cylinder head 2 so as to open in the upper surface thereof and communicate with the exhaust port 6.

When the cylinder head 2 is connected to the cylinder head cover 17, the first and second secondary air supply passages 34,35 of the downstream side are connected to each other by means of a connecting joint 36. These secondary air passages 34 and 35 are formed with substantially equal diameters. A sucking force generated as a result of pulsation of exhaust pressure in the exhaust port 6 acts to open the reed 27 thereby to permit the secondary air to flow from the upstream chamber a into the exhaust port 6 through the downstream chamber b and the first and second secondary air supply passages 34 and 35.

Between the ends of the connecting joint 36 and the opposing ends of the first and second secondary air supply passages 34,35, are "O" rings 38 and 39 to provide seals therebetween.

The connection joint 36 serves also as a guide member for guiding the cylinder head cover 17 when the latter is mounted on the cylinder head 2. The portions of the first and second secondary air supply passages 34,35 adjacent to the connection joint 36 are reinforced with ribs 40 and 41 which serve also as cooling fins.

As shown in FIG. 1, guard members 42 each having a rectangular frame-like shape are connected at their front ends to both sides of the down tube d of the frame F of the motorcycle. Each guard member 42 extends rearwardly along the length of the frame F so as to surround the upper side of the cylinder head cover 17 of each cylinder block 1 of the horizontal type engine E. The reed valve device L is disposed at the inner side of the guard member 42.

Now, the operation of the exhaust gas cleaning device of the invention as described above will be explained hereinafter.

As the engine E is started, pulsative pressure of exhaust gas is generated in the exhaust port 6 and transmitted through the first and second secondary air supply passages 35,34 to the reed valve member 23 to open the latter. Then, the control valve 33 opens to introduce a part of the fresh air in the air cleaner 8 into the upstream chamber a in the valve housing 18 through the secondary air introduction tube 32 and then into the downstream chamber b through the valve port 26 of each reed valve member 23. The air is then fed to the exhaust port 6 through the downstream first secondary air passage 34, connection joint 36 and the downstream second secondary air passage 35. The secondary air thus supplied to the exhaust port 6 is then mixed with the exhaust gas in the exhaust port 6 and serves to oxidize the unburnt noxious components such as HC,CO and so forth in the exhaust gas flowing through the exhaust port 6 and the exhaust pipe 9. The exhaust gas mixed with the secondary air flows into the muffler 10 to promote the reaction of the catalytic converter 11 incorporated in the muffler 10 thereby to finally oxidize and remove the unburnt noxious components before discharge to the atmosphere.

The guard member 42 surrounding the upper part of the cylinder head cover 17 of the cylinder block 1 can protect the reed valve device L from contact with any obstruction. Particularly, the guard member 42 is effective for preventing the reed valve device L from contacting the road surface R even when the motorcycle is inclined at a large bank angle $\alpha$ as shown in FIG. 2.

It is necessary for the upstream chamber a of the reed valve device L to have a sufficiently large volume, for otherwise the pressure in the upstream chamber a would be lowered largely by each sucking action due to the pulsation of the exhaust gas pressure, to cause a larger pressure loss and an increase of the resistance to the sucked air. As a result, the rate of suction of the secondary air would be decreased undesirably. In the worst case, it becomes impossible to supply the secondary air at a rate sufficient for the oxidation of the unburnt noxious components.

According to the invention, in the reed valve device L of the exhaust gas cleaning device of the invention, the upstream chamber a can be formed with a sufficiently large volume even with a small height because the area of the upstream chamber a facing the plane of the reed valve member 23 is made greater than the projection area of the reed valve member. According to the invention, therefore, it is possible to suck the secondary air at a sufficiently large rate into the upstream chamber a by each sucking action caused by the pulsation of the exhaust gas pressure, thereby to ensure the oxidation and removal of the unburnt noxious components in the exhaust gas.

It is also to be noted that the overall length of the cylinder block 1 is never disadvantageously increased by the mounting of the device of the invention on the engine E.

According to the invention, the reed valve housing 18 can be constructed simply by mounting the cover member 18$_2$ on the housing structure 18$_1$ of the cylinder head cover 17. In addition, the reed valve member 23 is firmly clamped between the projections 24 projecting from the inner surface of the cover member 18$_2$ and the housing structure 18$_1$ of the cylinder head cover 17. Thus, the cover member 18$_2$ can serve not only as a constituent of the valve housing 18 but also as a fixing means for the reed valve member 23. In consequence, the assembling of the reed valve device L is substantially facilitated and the number of parts is reduced to simplify the whole structure, lowering the production cost to a great extent.

The reed valve member 23 continuously repeats vibratory movements in response to the pulsations of the exhaust gas pressure, so that the heat-resistant packing 22, through which the reed valve member 23 is pressed by the projections 24, is liable to be cracked. This problem, however, is avoided in the present invention because, as stated before, the tip end of each projection 24 is rounded as shown at R or shaped at an obtuse angle. This in turn eliminates the necessity of use of expensive material for the heat-resistant packing in order to avoid the cracking.

According to the invention, the reed valve device L is provided at the outer side of the cylinder head cover 17 of the cylinder block 1 projecting laterally from each side of the frame F of the motorcycle, and the upstream and downstream secondary air passages 30 and 34 connected to the inlet i and the outlet o of the reed valve device L, respectively, are formed directly in the cylinder head cover 17. It is, therefore, not necessary to arrange specific pipes for the upstream and downstream secondary air passages 30 and 34. Accordingly, any interference of the upstream and downstream secondary air passages 30 and 34 with external obstructions can not occur even though the cylinder head cover 17 projects laterally from each side of the frame F, so that the passages 30 and 34 are protected from any damaging force. Since the upstream secondary air passage 30 and the downstream secondary air passage 34 formed in the cylinder head cover 17 have sufficiently large rigidity, they can always supply the secondary air at the optimum rate to the exhaust port 6.

By reinforcing at least a part of the upstream secondary air passage 30 and the downstream secondary air passage 34 with reinforcement ribs 40 serving as cooling fins, the secondary air flowing through these passages is effectively cooled to suppress the tendency of deterioration of the reed valve devices L due to heat, while strengthening the passages 30 and 34.

In addition, since the outer surface of the reed valve device is smoothly connected to the outer surface of the cylinder head cover 17 fo form a smooth outer surface of the head portion of the engine E, it is possible to mount the reed valve device L without requiring any substantial change of the appearance of the engine E. The outer surface or contour of the cylinder head cover 17, which is kept smooth even with the mounting of the reed valve device L, is not affected by external disturbances and it does not increase the running resistance of the motorcycle even though the cylinder head cover 17 projects laterally from the frame. Also, the laterally projected cylinder cover does not degrade the appearance of the motorcycle. It is also understood that the lay-out and mounting of the other equipment of the engine are not hindered by the mounting of the reed valve device L.

According to the invention, each of the reed valve devices L is mounted at the outer side of the cylinder head cover 17 the horizontal type engine. Both of the upstream secondary air supply passage 30 interconnecting the inlet of the reed valve device L and the atmosphere and the downstream secondary air supply passage 34 interconnecting the outlet of the reed valve device L and the exhaust port 6 are disposed between the reed valve device L on the head of the cylinder block 1 and the frame F of the motorcycle. In addition, the outer periphery of the cylinder head cover 17 is surrounded by the guard member 42 supported by the frame F. Therefore, the reed valve device L itself, as well as the upstream and downstream secondary air supply passages 30, 34, 35 located at the inner side of the reed valve device L, are safely protected against any obstruction which could otherwise contact and damage the reed valve device L and the passages 30, 34, 35.

The cylinder head cover 17 can be easily demounted clearing the guard member 42, so that the maintenance work not only of the reed valve device L but also various parts of the engine such as the tappets is substantially facilitated.

While a presently preferred embodiment of the invention has been shown and described, it is clear to those skilled in the art that various changes and modifications may be made without departing from the spirit of the invention or the scope of the appended claims.

What is claimed is:

1. An exhuast gas cleaning device for an internal combustion engine having a cylinder block including a cylinder head and a cylinder head cover on said cylinder head, said exhaust gas cleaning device comprising: an exhaust system having an exhaust port, a secondary air supply system having an upstream secondary air supply passage communicating with the atmosphere and a downstream secondary air supply passage communicating with said exhaust port for supplying secondary air to said exhaust system, and a reed valve device in said secondary air supply system adapted to open and close in response to pulsations of exhaust gas pressure in said exhaust system during operation of said engine, said reed valve device including: a valve housing having a housing structure formed on the cylinder head cover of the engine and a cover member secured to said housing structure, said cover member including a plurality of projections projecting inwardly from the inner surface thereof; and a reed valve member clamingly held between said housing structure and said projections of said cover member, said reed valve member dividing a space provided in said housing into an upstream chamber connected to said upstream secondary air supply passage and a downstream chamber connected to said downstream secondary air passage, the planar area of said upstream chamber facing said reed valve member being greater than the area of said reed valve member.

2. An exhaust gas cleaning device for an internal combustion engine as claimed in claim 1, wherein each projection projected from the inner surface of said cover member has a free end which is rounded or shaped at an obtuse angle.

3. An exhaust gas cleaning device for an internal combustion engine as claimed in claim 1, wherein the head portion of said engine has a smooth outer surface constituted by the outer surface of said cylinder head cover and the outer surface of said cover member.

4. An exhaust gas cleaning device for an internal combustion engine as claimed in claim 1, wherein said reed valve device is disposed at the outer side of said cylinder head cover, and said upstream secondary air supply passage and said downstream secondary air supply passage are formed directly in said cylinder head cover, said upstream secondary air supply passage and said downstream secondary air supply passage being provided on at least a part of the outer periphery thereof with reinforcement ribs integral with said cylinder head cover and serving also as cooling fins.

5. An exhaust gas cleaning device for an internal combustion engine as claimed in claim 1, wherein said engine is a horizontal type engine mountable on a vehicle frame whose cylinder blocks are arranged to extend laterally and horizontally of said frame, said reed valve device being on the outer side of said cylinder head cover, said upstream secondary air supply passage and said downstream secondary air supply passage being arranged in the head portion of said cylinder block between said reed valve device and said frame, the outer periphery of said cylinder head cover being surrounded by a guard member supported by said frame.

6. An exhaust gas cleaning device as claimed in claim 1 comprising a seal between said reed valve member and said housing structure, said projections being arranged to press against said seal.

7. An exhaust gas cleaning device as claimed in claim 1 comprising a connection joint sealingly engaged in said cylinder head cover and said cylinder head to provide a continuous connection for said downstream secondary air supply passage, said connection joint guidingly engaging said cylinder head cover and cylinder head.

8. A motorcycle comprising a frame, and an internal combustion engine supported by said frame, said engine being mounted horizontally on said frame and including opposed cylinder blocks projecting laterally at opposite sides of said frame, each block including a cylinder head having intake and exhaust ports and a cylinder head cover on said cylinder head, said cylinder head cover having a remote lateral end with an outer surface, reed valve means mounted on said cover and forming a smooth contour therewith at said outer surface, secondary air supply means having a passage integrally formed in said cylinder head cover leading to said reed valve means, and secondary air delivery means having a passage integrally formed in said cylinder head cover leading from said reed valve means to said exhaust port, said reed valve means supplying secondary air from said passage of the secondary air supply means to said passage of said secondary air delivery means for supplying secondary air to engine exhaust gases via said exhaust port.

9. A motorcycle as claimed in claim 8 wherein said cylinder head cover is provided with a recess, said reed valve means being mounted in said recess and including a cover member shaped to merge smoothly with said cylinder head cover and thereby form said smooth contour therewith.

10. A motorcycle as claimed in claim 9 wherein said reed valve means further includes a valve member and projection means on said cover member holding said valve member against said cylinder head cover.

11. A motorcycle as claimed in claim 10 wherein said projection means have ends for contacting said valve member, said ends being profiled.

12. A motorcycle as claimed in claim 10 wherein said valve member divides said recess into upstream and downstream chambers respectively connected to said passage of said secondary air supply means and said passage of said secondary air delivery means, said upstream chamber having a planar area facing said reed valve member which is greater than the area of said reed valve member.

13. A motorcycle as claimed in claim 9 comprising cooling fins on said cylinder head and cylinder head cover in the region of said passage of said secondary air delivery means for reinforcing said passage.

14. A motorcycle as claimed in claim 13 wherein said cylinder blocks have upper and lower sides, said passage of said secondary air delivery means being located in said block closer to said lower side, said fins being on said lower side.

15. A motorcycle as claimed in claim 9 comprising a guard member secured to said frame and perimetrally surrounding each said block at the upper, lower, and laterally outer sides thereof.

* * * * *